United States Patent
Tsirkin

(10) Patent No.: US 10,810,031 B2
(45) Date of Patent: Oct. 20, 2020

(54) DIRTY MEMORY TRACKING WITH ASSIGNED DEVICES BY EXITLESS PARAVIRTUALIZATION

(71) Applicant: Red Hat Israel, Ltd., Ra'anana (IL)

(72) Inventor: Michael Tsirkin, Ra'anana (IL)

(73) Assignee: RED HAT ISRAEL, LTD., Raanana (IL)

( * ) Notice: Subject to any disclaimer, the term of this patent is extended or adjusted under 35 U.S.C. 154(b) by 181 days.

(21) Appl. No.: 14/867,528

(22) Filed: Sep. 28, 2015

(65) Prior Publication Data

US 2017/0090965 A1 Mar. 30, 2017

(51) Int. Cl.
*G06F 9/48* (2006.01)
*G06F 9/455* (2018.01)

(52) U.S. Cl.
CPC ........ *G06F 9/45558* (2013.01); *G06F 9/4856* (2013.01); *G06F 2009/45579* (2013.01); *G06F 2009/45583* (2013.01)

(58) Field of Classification Search
CPC ............... G06F 9/45558; G06F 9/4856; G06F 2009/45579
See application file for complete search history.

(56) References Cited

U.S. PATENT DOCUMENTS

| | | | |
|---|---|---|---|
| 8,086,821 B2 | 12/2011 | Mukherjee et al. | |
| 8,239,609 B2 | 8/2012 | Hudzia et al. | |
| 8,533,713 B2 | 9/2013 | Dong | |
| 8,924,965 B2 | 12/2014 | Tsirkin et al. | |
| 8,990,520 B1 * | 3/2015 | Tang | G06F 12/1072 711/154 |
| 2005/0278492 A1 * | 12/2005 | Stakutis | G06F 11/2082 711/161 |
| 2007/0260768 A1 * | 11/2007 | Bender | G06F 12/1081 710/22 |
| 2012/0102084 A1 | 4/2012 | Hiltunen et al. | |
| 2012/0179855 A1 | 7/2012 | Tsirkin et al. | |

(Continued)

OTHER PUBLICATIONS

Liu et al. High Performance VMM-Bypass I/O in Virtual Machines. [online] (2006). USENIX., pp. 1-15. Retrieved From the Internet <http://www.cs.columbia.edu/~cdall/candidacy/pdf/Liu2006.pdf>.*

(Continued)

*Primary Examiner* — Emerson C Puente
*Assistant Examiner* — Jonathan R Labud
(74) *Attorney, Agent, or Firm* — Haynes and Boone, LLP

(57) ABSTRACT

An example method of tracking memory modified by an assigned device includes allocating, by a hypervisor running a virtual machine, guest memory to a guest running on the virtual machine, where a device is assigned to the virtual machine. The method also includes reading, while the virtual machine is running on the hypervisor, a first input/output (I/O) state that indicates whether the device is currently processing one or more I/O requests, where the first I/O state is writable by the guest. The method further includes determining whether the first I/O state indicates that the device is currently processing one or more I/O requests. The method also includes determining to not transmit a memory page to a destination in response to determining that the first I/O state indicates that the device is currently processing one or more I/O requests. The memory page corresponds to the first I/O state.

20 Claims, 8 Drawing Sheets

(56) References Cited

U.S. PATENT DOCUMENTS

2013/0130651 A1* 5/2013 Deasy .................. H04L 63/105
　　　　　　　　　　　　　　　　　　　　　455/411
2013/0254404 A1 9/2013 Johnsen et al.

OTHER PUBLICATIONS

Clark et al. Live Migration of Virtual Machines. [online] (2005). ACM., pp. 1-14. Retrieved From the Internet <http://www.cs.ubc.ca/~andy/papers/nsdi-migration.pdf>.*

Lagar-Cavilla et al. VMM-Independent Graphics Acceleration. [online] (2007). ACM., pp. 1-11. Retrieved From the Internet <http://tolia.org/files/pubs/vee2007.pdf>.*

Garzarella et al. Virtual device passthrough for high speed VM networking. [online] (May 2015). IEEE/ACM., pp. 1-12. Retrieved From the Internet <file:///C:/Users/jlabud/Documents/e-Red%20Folder/14867528/Virtual%20device%20passthrough%20for%20high%20speed%20VM%20networking.pdf>.*

Yassour et al. Direct Device Assignment for Untrusted Fully-Virtualized Virtual Machines. [online] (Sep. 20, 2008). IBM., pp. 1-8. <https://www.researchgate.net/profile/Muli_Ben-Yehuda/publication/228750224_Direct_device_assignment_for_untrusted_fully-virtualized_virtual_machine> (Year: 2008).*

Abel Gordon, Nadav Harel, Alex Landau, Muli Ben-Yehuda, Avishay Traeger, "Towards Exitless and Efficient Paravirtual I/O," Jun. 4-6, 2012, 6 pages, IBM Research—Haifa; retrieved from http://www.mulix.org/pubs/eli/elvis-systor12.pdf Sep. 3, 2015.

Rinku Shah; "Network I/O Virtualization : Challenges and Solution Approaches,"; Apr. 2014, 50 pages, Department of Computer Science and Engineering Indian Institute of Technology, Bombay; retrieved from http://www.cse.iitb.ac.in/synerg/lib/exe/fetch.php?media=public:students:rinku:phd_seminar_report_250414.pdf on Sep. 3, 2015.

Simon Sturm; "Interconnect Adapter State Migration for Virtual HPC Clusters," Jun. 19, 2012-Jan. 18, 2013; 88 pages, Faculty of computer science, Karlsruher Institut for Technologie ; retrieved from https://os.itec.kit.edu/downloads/da_2013_sturm-simon_interconnect-adapter.pdf on Sep. 3, 2015.

Zhenhao Pan, Yaozu Dong, Yu Chen, Lei Zhang, Zhijiao Zhang, "CompSC: Live Migration with Pass-through Devices" Mar. 3-4, 2012; 12 pages; Tsinghua University Beijing, China; Intel Asia-Pacific Research and Development Ltd No. 880 Zi Xing Rd, Shanghai, China; retrieved from http://www.cl.cam.ac.uk/research/srg/netos/vee_2012/papers/p109.pdf on Sep. 3, 2015.

* cited by examiner

DIRTY MEMORY TRACKING WITH ASSIGNED DEVICES BY EXITLESS PARAVIRTUALIZATION

FIELD OF DISCLOSURE

The present disclosure generally relates to virtualization, and more particularly to assigned devices in a virtual environment.

BACKGROUND

A virtual machine (VM) is a portion of software that, when executed on appropriate hardware, creates an environment allowing the virtualization of an actual physical computer system. Each VM may function as a self-contained platform, running its own operating system (OS) and software applications (processes). A host machine (e.g., computer or server) is typically enabled to simultaneously run one or more VMs, where each VM may be used by a local or remote client. The host machine allocates a certain amount of the host's resources to each of the VMs. Each VM may use the allocated resources to execute applications, including OSs known as guests or guest OSs. The hypervisor virtualizes the underlying hardware of the host machine or emulates hardware devices, making the use of the VM transparent to the guest OS or the remote client that uses the VM. Typically, a hypervisor manages allocation and virtualization of computer resources and performs context switching, as may be necessary, to cycle between various VMs.

An assigned device is a physical device that is exposed to a guest as part of the VM and may also be known as a pass-through device. An assigned device is also known as a pass-through device because the hypervisor acts as a "pass-through" for communications between the VM and host machine. Device assignment allows the guest running on the VM to have direct access to the assigned device. The overhead of virtualization is low because a big portion of the functionality for accessing the assigned device is running within the VM. Accordingly, device assignment may result in faster performance compared to the guest accessing an emulated device.

Assigning a device to the VM, however, may have some disadvantages. For example, devices typically do not trigger page faults. Accordingly, the hypervisor may be unable to detect memory changes by assigned devices. This may cause problems if the VM is migrated. For example, the hypervisor may be unable to correctly update the memory on the migration destination.

BRIEF SUMMARY

This disclosure relates to tracking memory usage of a device assigned to a virtual machine. Methods, systems, and techniques for migration of a virtual machine using free page hinting are provided.

According to an embodiment, a method of tracking memory modified by an assigned device includes allocating, by a hypervisor running a virtual machine, guest memory to a guest running on the virtual machine. A device is assigned to the virtual machine. The method also includes reading, while the virtual machine is running on the hypervisor, a first input/output (I/O) state that indicates whether the device is currently processing one or more I/O requests. The first I/O state is writable by the guest. The method further includes determining whether the first I/O state indicates that the device is currently processing one or more I/O requests. The method also includes determining to not transmit a memory page to a destination in response to determining that the first I/O state indicates that the device is currently processing one or more I/O requests. The memory page corresponds to the first I/O state.

According to another embodiment, a system for tracking memory modified by an assigned device includes a guest running on a virtual machine. A device is assigned to the virtual machine, and the guest updates a first input/output (I/O) state that indicates whether the device is currently processing one or more I/O requests. The system also includes a hypervisor that runs the virtual machine and allocates guest memory to the guest. The hypervisor reads, while the virtual machine is running on the hypervisor, the first I/O state. The hypervisor determines whether the first I/O state indicates that the device is currently processing one or more I/O requests. The hypervisor determines to not transmit a memory page to a destination in response to determining that the first I/O state indicates that the device is currently processing one or more I/O requests. The memory page corresponds to the first I/O state.

According to another embodiment, a non-transitory machine-readable medium includes a plurality of machine-readable instructions that when executed by one or more processors are adapted to cause the one or more processors to perform a method including: allocating, by a hypervisor running a virtual machine, guest memory to a guest running on the virtual machine, where a device is assigned to the virtual machine; reading, while the virtual machine is running on the hypervisor, a first input/output (I/O) state that indicates whether the device is currently processing one or more I/O requests, where the first I/O state is writable by the guest; determining whether the first I/O state indicates that the device is currently processing one or more I/O requests; and determining to not transmit a memory page to a destination in response to determining that the first I/O state indicates that the device is currently processing one or more I/O requests, where the memory page corresponds to the first I/O state.

BRIEF DESCRIPTION OF THE DRAWINGS

The accompanying drawings, which form a part of the specification, illustrate embodiments of the disclosure and together with the description, further serve to explain the principles of the embodiments. In the drawings, like reference numbers may indicate identical or functionally similar elements. The drawing in which an element first appears is generally indicated by the left-most digit in the corresponding reference number.

Embodiments of the present disclosure and their advantages are best understood by referring to the detailed description that follows.

DETAILED DESCRIPTION

I. Overview
II. Example System Architecture
A. Page Tables
B. Device Assignment
C. Guest Tracks Assigned Device's Progress in Completing an Input/Output (I/O) Request
III. Dirty Memory Tracking with Assigned Devices
A. Guest Updates First I/O State That Indicates Whether the Assigned Device is Currently Processing One or More I/O Requests
B. Guest Updates Second I/O State That Indicates Whether the Assigned Device Has Completed Processing the I/O Request
C. Guest Updates the First I/O State to Indicate That the Assigned Device is Not Currently Processing One or More I/O Requests
D. Hypervisor Transmits Data Stored At a Memory Region Updated by Assigned Device to a Destination
IV. Example Implementations
V. Example Methods
VI. Example Computing System

I. Overview

It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

The hypervisor may assign a device to a VM running on a host machine. For assigned devices, a guest sends a request to the hypervisor and the hypervisor passes the request along to a backend device without interpreting the request. The hypervisor may pass requests from the guest to the device without understanding the requests and without being able to detect memory changes by the device. In a virtual environment, some device state information runs through the actual hardware device, and some device state information does not run through the actual hardware device and is instead simulated in the hypervisor. Accordingly, the hypervisor may not be able to correctly update a destination with the memory changes.

The present disclosure provides techniques to track memory that has been modified by a device assigned to a VM. Unless specifically stated otherwise, as apparent from the following discussion, it is appreciated that throughout the description, discussions utilizing terms such as "determining," "sending," "reading," "receiving," "transmitting," "providing," "allocating," "storing," "updating," "detecting," "identifying," "waiting," "setting," "allocating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

II. Example System Architecture

Figure 1:
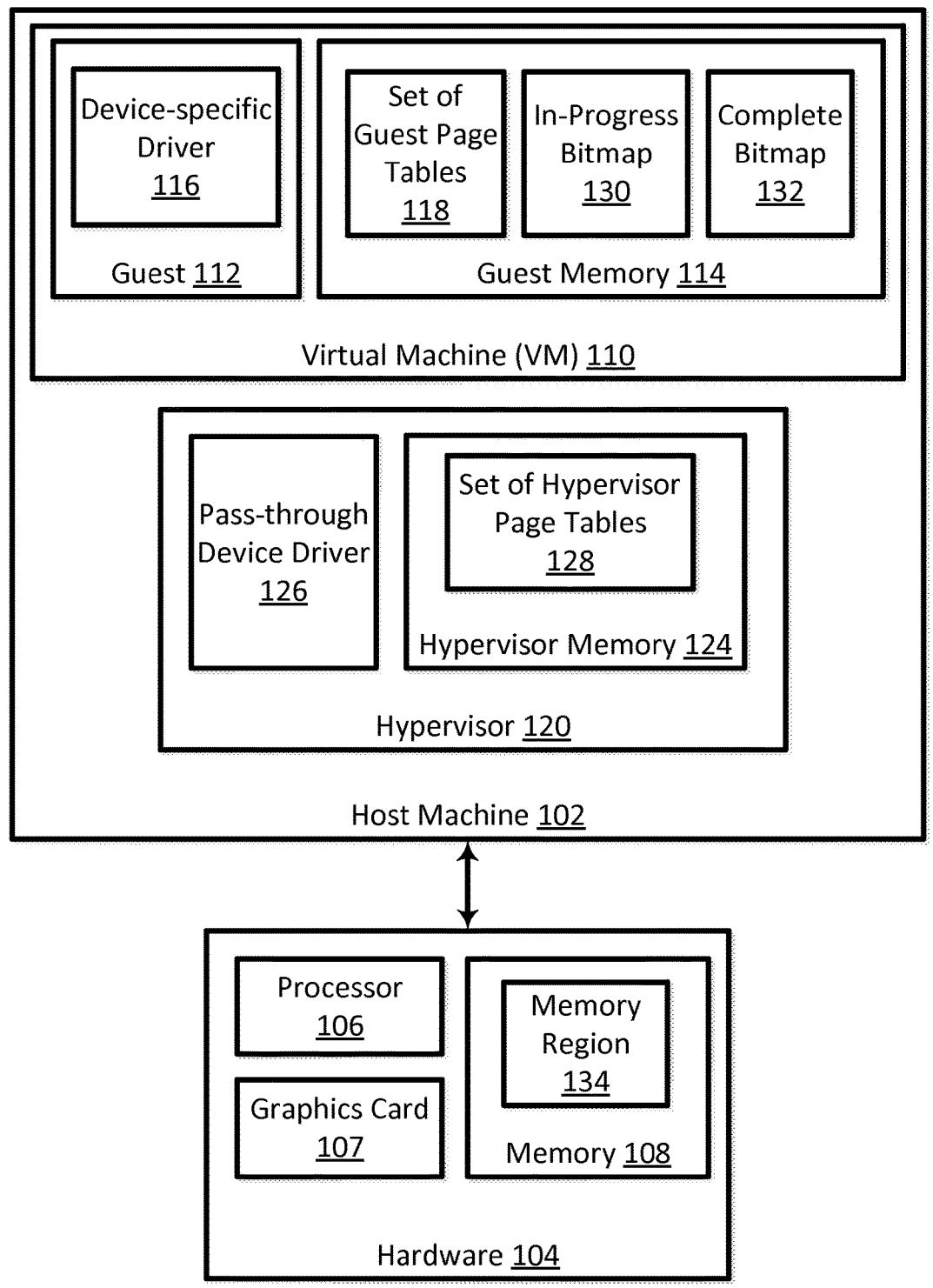
FIG. 1 is a block diagram illustrating a system for tracking memory modified by a device that is assigned to a VM in accordance with one or more embodiments.

FIG. 1 is a block diagram illustrating a system 100 for tracking memory modified by a device that is assigned to a VM in accordance with one or more embodiments. System 100 includes a host machine 102 coupled to hardware 104. Hardware 104 includes a processor 106, graphics card 107, and memory 108, and may include other input/output (I/O) devices.

A host machine may run one or more virtual machines (VMs) that run applications and services. Host machine 102 includes a VM 110 and a hypervisor 120. Although one VM is illustrated as running on host machine 102, other embodiments including more than one VM are within the scope of the present disclosure. The hypervisor may allow multiple operating systems, called guests or guest operating systems, to run on the same physical system by offering virtualized hardware to the guest. The host machine may run multiple operating systems, concurrently and in isolation from other programs on a single system. A guest running on the VM may be different from the host OS running on host machine. The host OS or guest may include, for example, MICROSOFT® WINDOWS®, LINUX®, SOLARIS®, and MAC® OS. Trademarks are the property of their respective owners.

A. Page Tables

In a virtualization environment, the hypervisor and each guest running in a host machine has its own set of page tables. Hypervisor 120 is allocated a hypervisor memory 124. Hypervisor 120 maintains a set of hypervisor page tables 128 in hypervisor memory 124. Set of hypervisor page tables 128 includes one or more mappings from guest-physical memory addresses to host-physical memory addresses, which correspond to physical memory on a native platform. Host-physical memory is hardware memory (e.g., memory 108).

Additionally, each guest maintains its own set of page tables. Guest 112 running on VM 110 may be provided with a guest memory 114. Guest memory 114 may be allocated to guest 112. Guest 112 maintains a set of guest page tables 118 in guest memory 114. Set of guest page tables 118 includes one or more mappings from guest-virtual memory addresses to guest-physical memory addresses, which are guest 112's illusion of physical memory. This illusion is supported by hypervisor 120, which maps guest 112's guest-physical memory addresses to host-physical memory addresses. The translation from guest-physical memory addresses to host-physical memory address is a real-to-physical mapping that implements the virtualization of memory in a VM system. The combined total size of the guest-physical memory space of all the guests running on host machine 102 may be bigger than the actual physical memory on the system.

Each entry in a guest page table maps a location in guest 112's virtual memory space to a location in guest 112's physical memory space. Address translation in guest 112 transforms addresses in its guest-virtual address space to locations in guest-physical memory using set of guest page tables 118. To convert a guest-physical memory address to a host-physical memory address, hypervisor 120 maintains a real map table mapping guest-physical memory pages to host-physical memory pages, and in particular uses set of hypervisor page tables 128 to translate guest-physical memory addresses to host-physical memory addresses.

B. Device Assignment

Hypervisor 120 may provide guest 112 with access to a device to perform input/output (I/O). The device may be a physical hardware device and may access a host backend that is coupled to host machine 102. Any guest as part of a VM to which a device is assigned may be capable of controlling the device. When guest 112 seeks to access the host backend, guest 112 may access the assigned device. The hypervisor may assign a device to a VM running on a host machine. The assigned device may be associated with memory regions that are mapped to the VM and has access to the memory of the VM to which the device is assigned. The assigned device may make use of memory regions that allow the processor to interact with the device via reads and writes to the memory. The memory of the assigned device may be used to program the device and may be mapped directly into the memory of the VM to which the device assigned. Accordingly, guest 112 may access the memory of the assigned device without causing an exit to hypervisor 120. As such, the memory is accessible to the assigned device. The memory regions may be implemented in different ways depending on the architecture and platform (e.g., Memory Mapped I/O (MMIO) or I/O port regions).

A VM may include a guest that executes a device driver that communicates with the hardware devices. In the example illustrated in FIG. 1, guest 112 may execute device-specific driver 116 that communicates directly with hardware devices without mediation from hypervisor 120. In an example, graphics card 107 is assigned to VM 110, and hypervisor 120 sends one or more communications to guest 112 to cause guest 112 to bind device-specific driver 116 to the assigned device. In this example, device-specific driver 116 is specific to graphics card 107, and guest 112 accesses the assigned device using device-specific driver 116. Device-specific driver 116 is capable of saving and restoring the state of graphics card 107, which is assigned to VM 110. Guest 112 issues requests to devices assigned to VM 110 and knows the results of the requests. It may be unnecessary for hypervisor 120 to interpret one or more requests issued from guest 112 to the assigned device. Rather, hypervisor 120 may receive requests from guest 112 to the assigned device, and pass the requests along to the assigned device for processing.

Hypervisor 120 includes a pass-through device driver 126. In some embodiments, a host backend that is used by an assigned device is bound to pass-through device driver 126. In such an example, the guest uses the assigned device, and pass-through device driver 126 receives a request from the guest to access the assigned device and forwards the request to the host backend device. It may be unnecessary for hypervisor 120 to have device-specific code. In some examples, pass-through device driver 126 is not specific to a device and does not provide the functionality of the device. Rather, pass-through device driver 126 receives requests from and passes requests to between guest 112 and the assigned device.

The assigned device may access and update memory pages in guest memory 114. Hypervisor 120 may be unable to detect updates to memory by the assigned device. As such, it may be difficult for hypervisor 120 to transmit the updated memory to a destination (e.g., a destination hypervisor upon migration or a display screen). For example, if VM 110 were to be migrated to a destination hypervisor, it may be difficult for hypervisor 120 to transmit the memory updated by the assigned device to the destination hypervisor. In another example, if host machine 102 is coupled to a display screen and graphics card 107 is the assigned device, it may be difficult for hypervisor 120 to update the relevant screen portion on the display screen. The present disclosure provides techniques to track the memory usage of an assigned device.

C. Guest Tracks Assigned Device's Progress in Completing an I/O Request

Guest 112 may provide hypervisor 120 with hints about an assigned device's progress in processing one or more I/O requests corresponding to one or more memory pages in guest memory 114. In some examples, guest 112 may provide hypervisor 120 with a hint as to whether the assigned device is currently processing one or more I/O requests or has completed processing I/O requests. The hints that are provided by guest 112 may be used by hypervisor 120 to track the pages updated by assigned devices. In some examples, guest 112 sends an I/O request to the assigned device, which writes data into a memory region. Guest 112 may then read data from the memory region.

Guest 112 may send an assigned device one or more I/O requests for processing and maintain I/O states to track the device's progress in completing the one or more I/O requests. For example, a first I/O state may indicate whether an assigned device is currently processing one or more I/O requests, and a second I/O state may indicate whether the assigned device has completed processing an I/O request. Guest 112 updates the first and second I/O states in accordance with the assigned device's progress in completing one or more I/O requests. The first and second I/O states may be stored in guest memory 114 by guest 112. In some examples, guest 112 may set the first I/O state to a first value to indicate that an assigned device is currently processing one or more I/O requests, and set the first I/O state to a second value to indicate that the assigned device is not currently processing one or more I/O requests. In some examples, guest 112 may set the second I/O state to a third value to indicate that the assigned device has completed processing an I/O request, and hypervisor 120 may set the second I/O state to a fourth value to indicate that the assigned device has not completed processing an I/O request. Hypervisor 120 sets the second I/O state to a value that is different from the third value so that the next time the hypervisor reads the second I/O state, it will not indicate that the assigned device has completed processing an I/O request.

A first I/O state and a second I/O state may correspond to the same memory page. For example, if guest 112 sends an I/O request to an assigned device, guest 112 may set the first I/O state corresponding to a memory page to indicate that the assigned device is currently processing one or more I/O requests and will update the memory page in accordance with the current processing of the I/O request. After the assigned device has completed processing an I/O request, guest 112 may set the second I/O state corresponding to the same memory page to indicate that the assigned device has completed processing an I/O request. If the second I/O state is set to indicate that the assigned device has completed processing an I/O request, hypervisor 120 may determine that the memory page has been updated by the assigned device and is safe to transmit to a destination. After guest 112 sets the second I/O state to indicate that the assigned device has completed processing an I/O request, guest 112 may set the first I/O state to indicate that the assigned device is not currently processing one or more I/O requests. Accordingly, hypervisor 120 may be able to determine the assigned device's progress in processing I/O requests and whether corresponding memory pages are safe to transmit or whether the assigned device is still working on particular memory pages. In some examples, the first I/O state corresponds to a memory page that is different from the memory page corresponding to the second I/O state.

Guest 112 may use various data structures to maintain this information. In the example illustrated in FIG. 1, guest 112 maintains an I/O in-progress bitmap 130 and an I/O complete bitmap 132 in guest memory 114 to keep track of the device's progress in completing one or more I/O requests submitted from guest 112 to the device. I/O in-progress bitmap 130 and I/O complete bitmap 132 are located in guest memory 114, and bits in these bitmaps may be read or changed at any time. Each of I/O in-progress bitmap 130 and I/O complete bitmap 132 may include a plurality of bits that each correspond to a memory page in guest memory 114 and to a device assigned to VM 110. In some examples, each bit in I/O in-progress bitmap 130 may correspond to a memory page in guest memory 114 and indicate whether an assigned device (e.g., graphics card 107) is currently using the memory page to process one or more I/O requests. Additionally, each bit in I/O complete bitmap 132 may correspond to a memory page in guest memory 114 and indicate whether an assigned device has completed processing an I/O request that may or may not correspond to the respective bit in I/O in-progress bitmap 130.

In some examples, guest 112 may set an in-progress bit in I/O in-progress bitmap 130 to indicate that an assigned device is currently processing one or more I/O requests, and may clear the in-progress bit to indicate that the assigned device is not currently processing one or more I/O requests. Additionally, guest 112 may set a complete bit in I/O complete bitmap 132 to indicate that an assigned device has completed processing an I/O request, and hypervisor 120 may clear the complete bit if hypervisor 120 reads the complete bit and detects that the complete bit is set. In some examples, guest 112 sets an in-progress bit in I/O in-progress bitmap 130 to one and sends a first I/O request to an assigned device, which updates a memory page corresponding to the in-progress bit. The memory page is updated by the assigned device after it has completed processing the I/O request. In response to detecting that the assigned device has completed processing a second I/O request (that may be the same as or different from the first I/O request), guest 112 may then set a complete bit in I/O complete bitmap 132 to one and set the in-progress bit in I/O in-progress bitmap 130 to zero.

Although I/O in-progress bitmap 130 and I/O complete bitmap 132 are illustrated as being located in guest memory 114, this is not intended to be limiting. It should be understood that I/O in-progress bitmap 130 and/or I/O complete bitmap 132 may reside in any memory region that is accessible by hypervisor 120. By storing in-progress bitmap 130 and I/O complete bitmap 132 at a memory region that is shared by guest 112 and hypervisor 120, it may be unnecessary for the updates from guest 112 to I/O in-progress bitmap 130 and I/O complete bitmap 132 and the reading of these bitmaps by hypervisor 120 to cause an exit to hypervisor 120.

It should also be understood that I/O in-progress bitmap 130 and I/O complete bitmap 132 may be combined into a single bitmap. Moreover, although the data structure that is used by guest 112 to track the assigned device's memory changes is illustrated as being a bitmap, this is not intended to be limiting and other embodiments having a data structure different from a bitmap are within the scope of the present disclosure. For example, the data structure may be any data structure that stores values that correspond to memory pages in guest memory 114 and that indicate the assigned device's progress in completing an I/O request.

Further, any value may be used to indicate that an assigned device is currently processing one or more I/O requests or is currently not processing one or more I/O requests. Likewise, any value may be used to indicate that an assigned device has completed processing an I/O request or has not completed processing an I/O request. For example, although a set bit in I/O in-progress bitmap 130 may be described as indicating that the assigned device is currently processing one or more I/O requests, this is not intended to be limiting. Any value (represented by one or more bits or a cleared bit) may be used to indicate that the assigned device is currently processing one or more I/O requests or not processing one or more I/O requests. Similarly, although a set bit in I/O complete bitmap 132 may be described as indicating that the assigned device has completed processing an I/O request, this is not intended to be limiting. Any value (represented by one or more bits or a cleared bit) may be used to indicate that the assigned device has completed processing an I/O request or has not completed processing an I/O request.

III. Dirty Memory Tracking with Assigned Devices

Figure 2A:
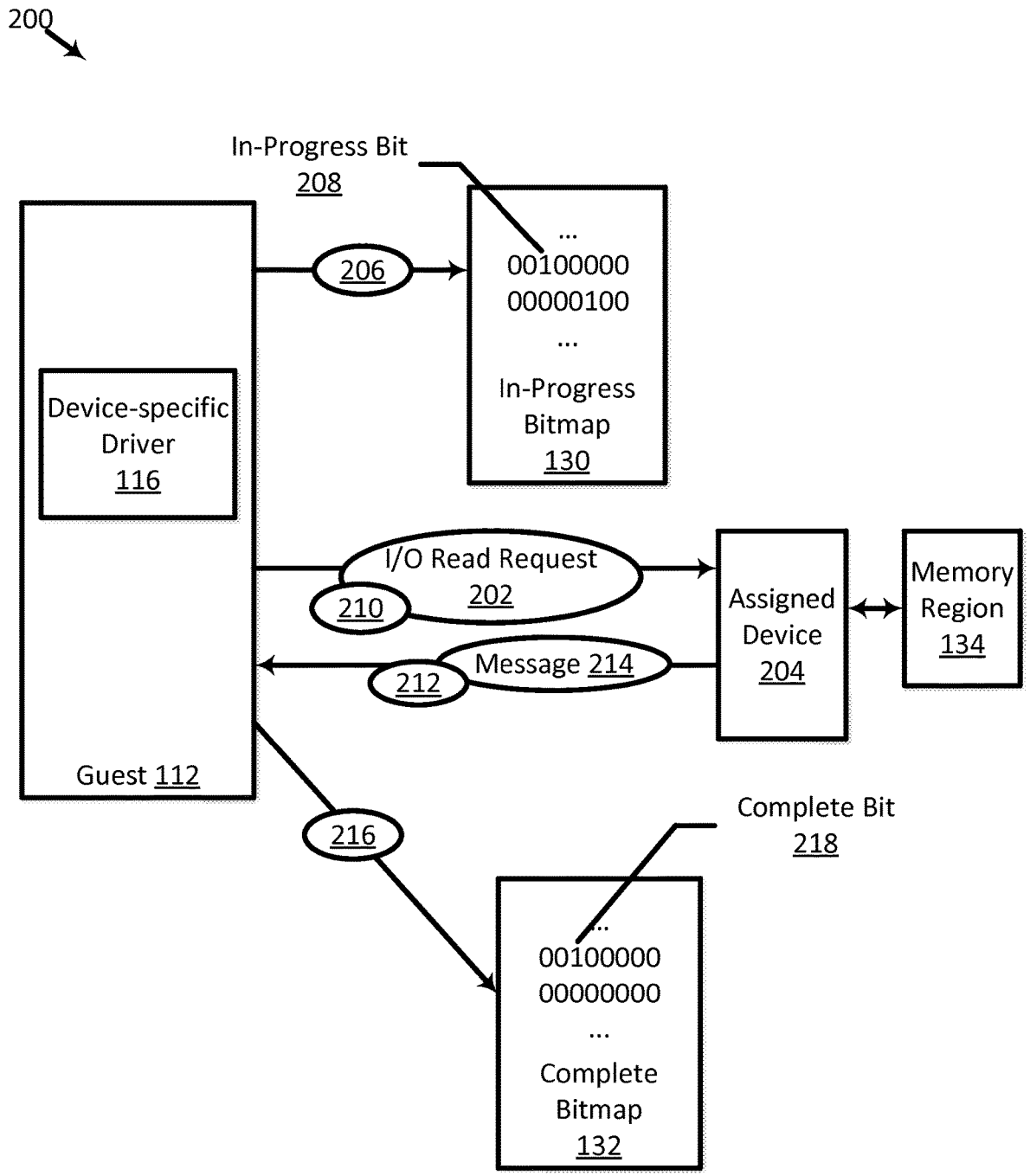
FIGS. 2A and 2B are process flows illustrating a method of updating an I/O in-progress bitmap and an I/O complete bitmap in accordance with one or more embodiments.
Figure 2B:
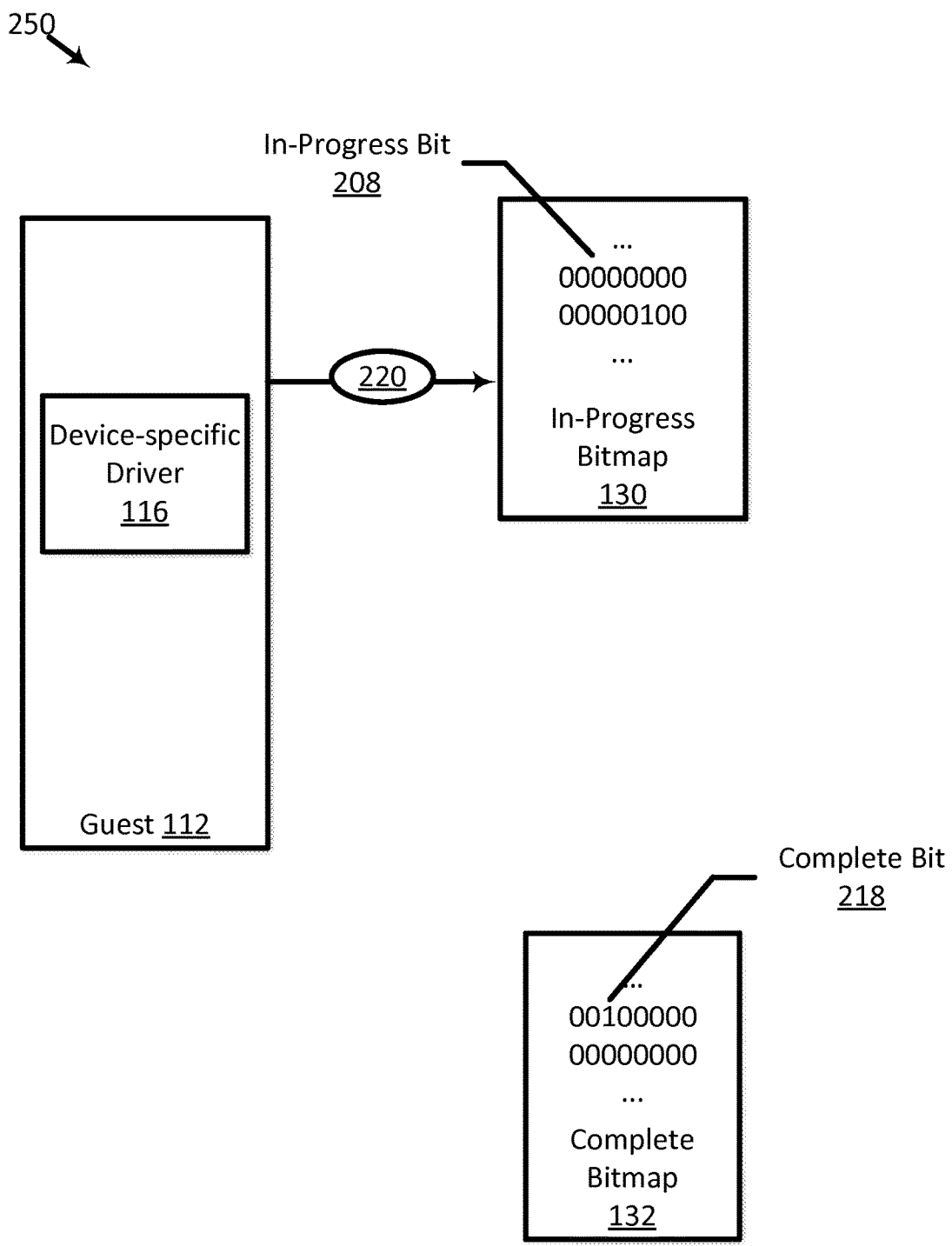

A. Guest Updates First I/O State that Indicates Whether the Assigned Device is Currently Processing One or More I/O Requests FIGS. 2A and 2B are process flows 200, 250 illustrating a method of updating I/O in-progress bitmap 130 and I/O complete bitmap 132 in accordance with one or more embodiments. In FIG. 2A, guest 112 may determine to send an I/O read request 202 to an assigned device 204. Device-specific driver 116 may be specific to assigned device 204, and assigned device 204 is a device that is assigned to VM 110. In an example, assigned device 204 is graphics card 107.

At an action 206, before guest 112 sends I/O read request 202 to assigned device 204, guest 112 updates a first I/O state indicating that the assigned device is currently processing one or more I/O requests. In the example illustrated in FIG. 2A, the first I/O state may refer to an in-progress bit 208 (and in-progress bit 208 may also refer to the first I/O state in some references) in I/O in-progress bitmap 130. In-progress bit 208 refers to the third bit in the first line of in-progress bit 208. The first I/O state is writable by guest 112. Guest 112 may update in-progress bit 208 by setting it to one to indicate that assigned device 204 is currently processing one or more I/O requests. In the example illustrated in FIG. 2A, I/O read request 202 is a read request that causes assigned device 204 to read data into a memory page that corresponds to in-progress bit 208 and that is in guest memory 114. In some examples, I/O read request 202 causes assigned device 204 to perform direct memory access (DMA) and read data into the memory page corresponding to in-progress bit 208. Guest 112 reads data from the memory page.

It may be advantageous for guest 112 to update the first I/O state to indicate that the assigned device is currently processing one or more I/O requests before sending an I/O request to assigned device 204 so that any entity reading the first I/O state (e.g., in-progress bit 208) or a particular memory page corresponding to the first I/O state knows that assigned device 204 is currently (or about to) process one or more I/O requests corresponding to particular memory pages. Accordingly, the entity reading the first I/O state knows to not access the memory page corresponding to in-progress bit 208 yet because the memory page's contents may be changed. Additionally, this may help avoid race conditions because if guest 112 sends an I/O request to the assigned device before updating the first I/O state to indicate that the assigned device is currently processing one or more I/O requests, the other entity reading the memory page corresponding to the first I/O state may read stale data.

At an action 210, guest 112 submits I/O read request 202 to assigned device 204 for processing after guest 112 updates I/O in-progress bit 208 to indicate that assigned device 204 is currently processing one or more I/O request. I/O read request 202 causes assigned device 204 to update memory region 134. For example, assigned device 204 receives I/O read request 202 and updates one or more memory pages in memory region 134 in accordance with the request.

B. Guest Updates Second I/O State that Indicates Whether the Assigned Device has Completed Processing the I/O Request If hypervisor 120 reads in-progress bit 208 and it is set to one, hypervisor 120 may determine that assigned device 204 is currently processing one or more I/O requests. In some examples, in response to determining that assigned device 204 is currently processing one or more I/O requests (e.g., in-progress bit 208 is set), hypervisor 120 waits for a time period to elapse, and reads in-progress bit 208 after the time period has elapsed. This prevents hypervisor 120 from disturbing the content or reading stale data stored in the memory page corresponding to in-progress bit 208.

At an action 212, after assigned device 204 has completed processing I/O read request 202, assigned device 204 may send a message 214 indicating that I/O read request 202 has been completed to device-specific driver 116. Guest 112 may receive message 214 and detect that assigned device 204 has completed processing I/O read request 202.

At an action 216, guest 112 updates a second I/O state indicating that the assigned device has completed processing an I/O request. The completed I/O request may be I/O read request 202 or may be a different I/O request that assigned device 204 has completed processing. In the example illustrated in FIG. 2A, the second I/O state may refer to a complete bit 218 (and complete bit may also refer to the second I/O state in some references) in I/O complete bitmap 132. Complete bit 218 refers to the third bit in the first line of I/O complete bitmap 132. The second I/O state is writable by guest 112. Guest 112 may update complete bit 218 by setting it to one to indicate that assigned device 204 has completed processing an I/O read request, which may be I/O read request 202 and associated with in-progress bit 208. If hypervisor 120 detects that complete bit 218 is set, hypervisor 120 may determine that the memory page corresponding to complete bit 218 is dirty and has been updated by the assigned device. In this way, hypervisor 120 may track the dirty memory pages of assigned devices.

C. Guest Updates the First I/O State to Indicate that the Assigned Device is not Currently Processing One or More I/O Requests After guest 112 sets complete bit 218 to one to indicate that assigned device 204 has completed processing an I/O read request, guest 112 may clear in-progress bit 208 in I/O in-progress bitmap 130 to indicate that assigned device 204 is not currently processing one or more I/O requests. In FIG. 2B, at an action 220, guest 112 sets in-progress bit 208 to zero to indicate that assigned device 204 is not currently processing one or more I/O requests. Accordingly, any entity that reads in-progress bit 208 as zero may determine that the assigned device is not currently processing one or more I/O requests using the memory page corresponding to in-progress bit 208.

Figure 3A:
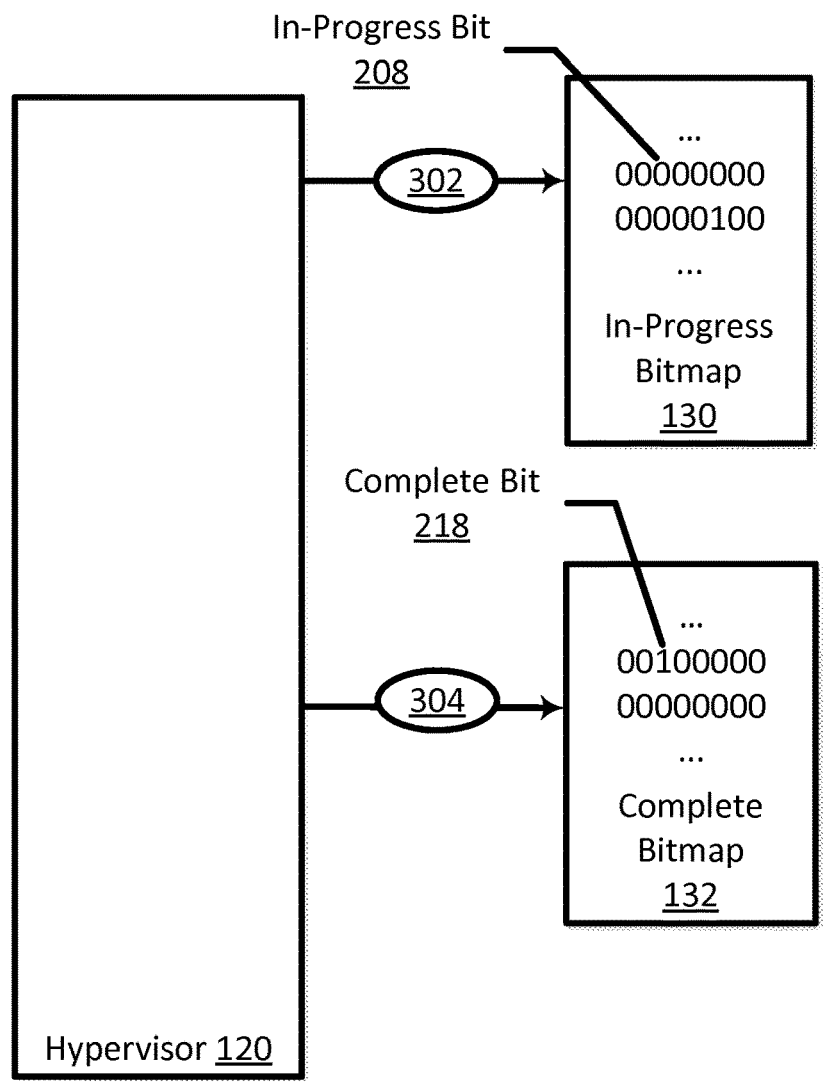
FIGS. 3A and 3B are process flows illustrating a method of tracking memory modified by an assigned device in accordance with one or more embodiments.
Figure 3B:
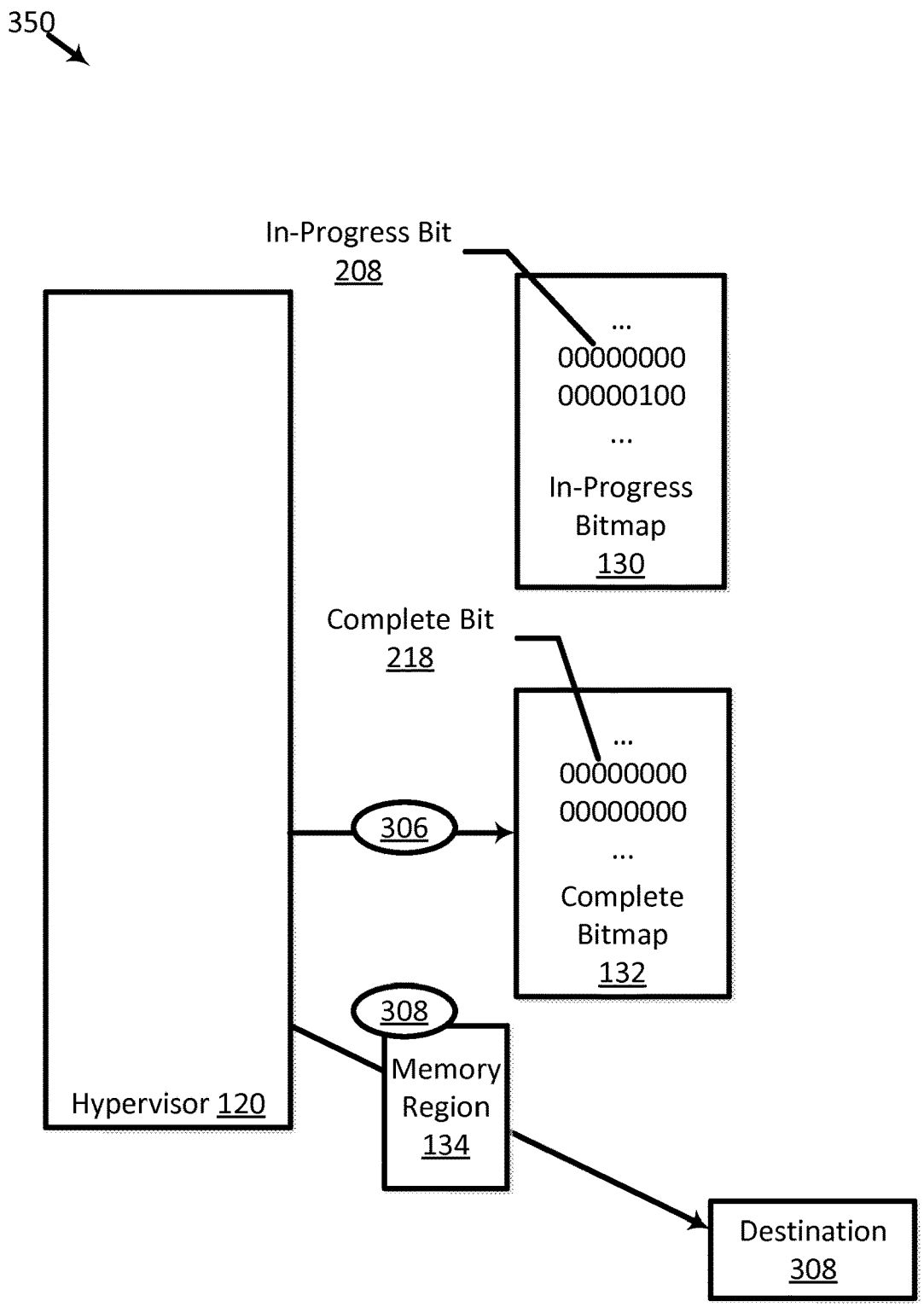

D. Hypervisor Transmits Data Stored at a Memory Region Updated by Assigned Device to a Destination FIGS. 3A and 3B are process flows 300, 350 illustrating a method of tracking memory modified by an assigned device in accordance with one or more embodiments. In FIG. 3A, hypervisor 120 may read, while VM 110 is running on hypervisor 120, the first I/O state indicating whether the assigned device is currently processing one or more I/O requests. Hypervisor 120 may determine whether the first I/O state indicates that the assigned device is currently processing one or more I/O requests. In keeping with the above example, if hypervisor 120 reads in-progress bit 208 and it is set to one, hypervisor 120 may determine that assigned device 204 is currently processing one or more I/O requests. If hypervisor 120 determines that assigned device 204 is currently processing an I/O request, hypervisor 120 may determine to not transmit a memory page corresponding to the first I/O state to a destination.

If hypervisor 120 determines that assigned device 204 is currently processing an I/O request, hypervisor 120 may stop and re-try reading in-progress bit 208 later. In some examples, in response to determining that assigned device 204 is currently processing an I/O request, hypervisor 120 waits for a time period to elapse, and then reads in-progress bit 208 after the time period has elapsed. Hypervisor 120 may continually re-try reading in-progress bit 208 until it is cleared (or is zero). Hypervisor 120 may wait until in-progress bit 208 is cleared to ensure that the assigned device is not currently processing an I/O request on the memory page corresponding to in-progress bit 208.

At an action 302, hypervisor 120 detects that the first I/O state indicates that assigned device 204 is not currently processing one or more I/O requests on the memory page corresponding to the first I/O state. In the example illustrated in FIG. 3A, hypervisor 120 detects that in-progress bit 208 is cleared (e.g., zero), which indicates that assigned device 204 is not currently processing one or more I/O requests on the memory page corresponding to the first I/O state.

At an action 304, hypervisor 120 reads, while VM 110 is running on hypervisor 120, the second I/O state in response to determining that the device is not currently processing one or more I/O requests. The second I/O state indicates whether the assigned device assigned to VM 110 has completed processing an I/O request, which may be associated with the first I/O state. Hypervisor 120 determines, based on the value of the second I/O state, whether assigned device 204 has completed processing an I/O request. If hypervisor 120 reads complete bit 218 and it is set to zero, hypervisor 120 may determine that assigned device 204 has not completed processing an I/O request. In some examples, in response to determining that assigned device 204 has not completed processing an I/O request (e.g., complete bit 218 is set to zero), hypervisor 120 waits for a time period to elapse, and reads complete bit 218 after the time period has elapsed. This prevents hypervisor 120 from disturbing the content or reading stale data stored in the memory page corresponding to complete bit 218.

Hypervisor 120 may detect that the second I/O state indicates that the assigned device has completed processing an I/O request in response to determining that the second I/O state is set to one. In the example illustrated in FIG. 3A, hypervisor 120 detects that complete bit 218 is set to one, which indicates that assigned device 204 has completed processing an I/O request on the memory page corresponding to the first I/O state.

In FIG. 3B, at an action 306, after hypervisor 120 detects that the assigned device has completed processing an I/O request, hypervisor may update the second I/O state corresponding to a memory page to indicate that the assigned device has not completed processing an I/O request that updates the memory page. In the example illustrated in FIG. 3B, after hypervisor 120 detects that complete bit 218 is set to one (see FIG. 3A), which indicates that assigned device 204 has completed processing an I/O read request (e.g., I/O read request 202 or another read request), hypervisor 120 may clear complete bit 218 (set complete bit 218 to zero) in I/O complete bitmap 132 to indicate that assigned device 204 has not completed processing an I/O request. Accordingly, any entity that reads complete bit 218 as zero may determine that the assigned device has not completed processing the I/O request corresponding to in-progress bit 208 and complete bit 218.

IV. Example Implementations

At an action 308, hypervisor 120 transmits data stored at memory region 134 to a destination 310. Hypervisor 120 may transmit one or more memory pages in memory region 134 to destination 310, where the one or more memory pages have been updated by the assigned device.

In some examples, destination 310 is a display device (not shown) coupled to host machine 102. In an example, graphics card 107 is a device assigned to VM 110, and memory region 134 is allocated to graphics card 107. Hypervisor 120 may transmit the data stored in memory region 134 to a display engine (not shown) that renders data to the display device. Accordingly, changes to memory region 134 may be reflected on the relevant screen portion of the display device.

In some examples, destination 310 is a secondary storage (not shown) coupled to host machine 102. In an example, the secondary storage is a device assigned to VM 110, and memory region 134 is allocated to the secondary storage. Hypervisor 120 transmits the data stored in memory region 134 to the secondary storage to store as a backup.

In some examples, destination 310 is a network interface card (NIC) (not shown) coupled to host machine 102. In an example, the NIC is a device assigned to VM 110, and memory region 134 is allocated to the NIC. Hypervisor 120 transmits the data stored in memory region 134 to the network interface card to transmit across a network.

In some examples, destination 310 is a destination hypervisor (not shown) running in a destination host machine (not shown). Hypervisor 120 may transmit memory region 134 to the destination hypervisor. Host machine 102 may be coupled to a destination host machine over a network. The destination host machine may include a destination hypervisor, and the network 140 may include various configurations and use various protocols including the Internet, World Wide Web, intranets, virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, WiFi and HTTP, and various combinations of the foregoing.

Hypervisor 120 may receive an indication to migrate VM 110 to the destination hypervisor. Hypervisor 120 transfers data stored in guest memory 114 (e.g., one or more memory pages in memory region 134) to a memory of the destination host machine. A VM may be migrated for a variety of reasons. In an example, hypervisor 120 knows that it is about to crash and migrates the VM to the destination hypervisor. In this way, the VM may remain active after hypervisor 120 crashes. In another example, a user wishing to update or service hypervisor 120 may notify guest 112 running in VM 110 of the migration. For instance, the user may wish to restart or reboot host machine 102. In response to the notification, guest 112 may request that hypervisor 120 initiate migration of VM 110 to the destination hypervisor.

In another example, host machine 102 may be resource constrained and VM 110 may be migrated to a destination host machine that runs the destination hypervisor for load balancing purposes. For instance, the hypervisor administrator may be aware that host machine 102 is resource constrained and desires to reduce the load on host machine 102. The hypervisor administrator may be, for example, a software module or a human being. In another example, the destination host machine may have more computing resources available compared to host machine 102 running the VM.

Further, after VM 110 has stopped running, some memory pages in guest memory 114 may need to be transmitted to the destination. In some examples, VM 110 stops using the assigned device 204 by itself. In some examples, hypervisor 120 sends a message to VM 110 that causes VM 110 to stop using the assigned device. The assigned device may be stopped to ensure that it does not perform direct memory access (DMA). After hypervisor 120 detects that VM 110 has stopped using the assigned device, hypervisor 120 may perform actions to transmit the rest of the memory pages or those that have been updated since sending to the destination in guest memory 114 to the destination.

In some examples, while VM 110 has stopped using assigned device 204, hypervisor 120 re-reads the second I/O state corresponding to a memory page and determines whether the re-read second I/O state indicates that the device has completed processing an I/O request that updates the memory page. In response to determining that the re-read second I/O state indicates that the device has completed processing the I/O request and while VM 110 has stopped using assigned device 204, hypervisor 120 may transmit the memory page corresponding to the second I/O state to the destination. Hypervisor 120 may perform these actions for one or more of the memory pages in guest 114. For example, if in-progress bits in I/O in-progress bitmap 130 indicate that the assigned device is in the process of currently processing one or more I/O requests corresponding to memory pages in guest memory 114, hypervisor 120 may handle those corresponding memory pages as dirty and may re-transmit them to destination 310.

In some examples, while VM 110 has stopped using assigned device 204, hypervisor 120 re-reads the first I/O state corresponding to a memory page and determines whether the re-read first I/O state indicates that the device is currently processing one or more I/O requests that update the memory page. In response to determining that the re-read first I/O state indicates that the device is currently processing one or more I/O requests and while VM 110 has stopped using assigned device 204, hypervisor 120 may transmit the memory page to the destination. For example, if complete bits in I/O complete bitmap 132 indicate that the assigned device is in the process of currently processing one or more I/O requests corresponding to memory pages in guest memory 114, hypervisor 120 may handle those corresponding memory pages as dirty and may re-transmit them to destination 310.

As discussed above and further emphasized here, FIGS. 1, 2A, 2B, 3A, and 3B are merely examples, which should not unduly limit the scope of the claims. Additionally, in some examples, a single byte in I/O in-progress bitmap 130 or a single byte in I/O complete bitmap 132 is shared for multiple memory pages in guest memory 114. Processor 106 may access this byte to read a bit corresponding to a memory page in guest memory 114. In this example, it may be desirable for hypervisor 120 to read and clear a bit in the bitmap (e.g., in-progress bit 208 in I/O in-progress bitmap 130 or complete bit 218 in I/O complete bitmap 132) in a single transaction to ensure that another processor is not attempting to set the bit in the byte at the same time. Accordingly, hypervisor 120 may atomically read and set a bit in a byte stored in I/O in-progress bitmap 130 or in I/O complete bitmap 132. In this example, the byte may correspond to multiple memory pages.

V. Example Methods

Figure 4:
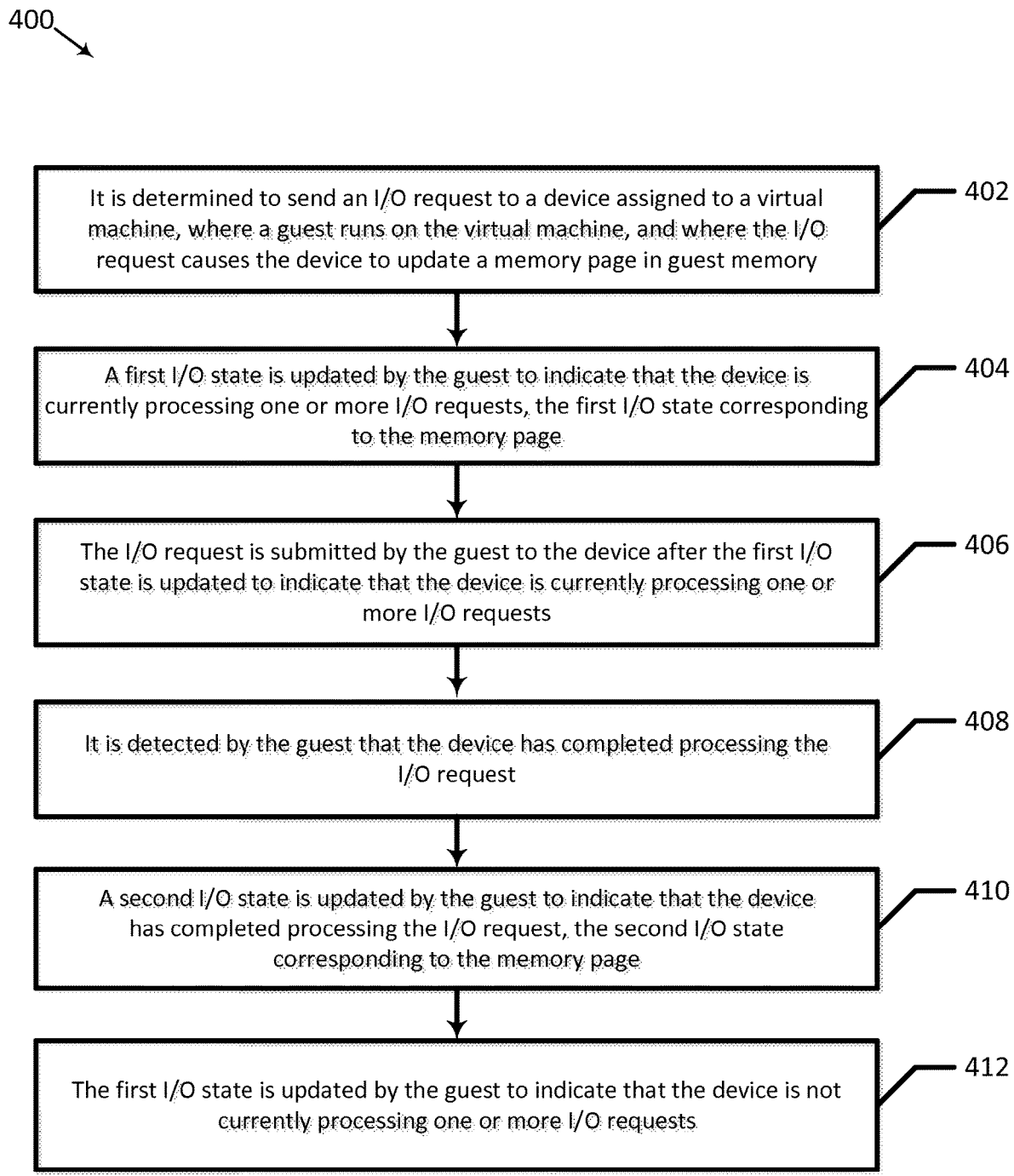
FIG. 4 is a flowchart illustrating a method of updating I/O states to hint at an assigned device's progress in completing an I/O request in accordance with one or more embodiments.

FIG. 4 is a flowchart illustrating a method 400 of updating I/O states to hint at an assigned device's progress in completing an I/O request in accordance with one or more embodiments. Method 400 is not meant to be limiting and may be used in other applications.

Method 400 includes blocks 402-412. In a block 402, it is determined to send an I/O request to a device assigned to a virtual machine, where a guest runs on the virtual machine, and where the I/O request causes the device to update a memory page in guest memory. In an example, guest 112 determines to send I/O read request 202 to assigned device 204, which is assigned to VM 110. Guest 112 runs on VM 110, and I/O read request 202 causes assigned device 204 to update memory region 134 in guest memory 114.

In a block 404, a first I/O state is updated by the guest to indicate that the device is currently processing one or more I/O requests, the first I/O state corresponding to the memory page. In an example, guest 112 updates the first I/O state to indicate that assigned device 204 is currently processing I/O read request 202, the first I/O state corresponding to a memory page in memory region 134. In this example, guest 112 may update the first I/O state by setting in-progress bit 208 to one to indicate that assigned device 204 is currently processing I/O read request 202. In a block 406, the I/O request is submitted by the guest to the device after the first I/O state is updated to indicate that the device is currently processing one or more I/O requests. In an example, guest 112 submits I/O read request 202 to assigned device 204 after the first I/O state is updated to indicate that assigned device 204 is currently processing I/O read request 202.

In a block 408, it is detected by the guest that the device has completed processing the I/O request. In an example, guest 112 detects that assigned device 204 has completed processing I/O read request 202. In a block 410, a second I/O state is updated by the guest to indicate that the device has completed processing the I/O request, the second I/O state corresponding to the memory page. In an example, guest 112 updates a second I/O state to indicate that assigned device 204 has completed processing I/O read request 202. In this example, guest 112 may update the second I/O state by setting complete bit 218 to one to indicate that assigned device 204 has completed processing I/O read request 202. In a block 412, the first I/O state is updated by the guest to indicate that the device is not currently processing one or more I/O requests. In an example, guest 112 updates the first I/O state to indicate that assigned device 204 is not currently processing one or more I/O requests. In this example, guest 112 may update the first I/O state by clearing in-progress bit 208 (set it to zero) to indicate that assigned device 204 is not currently processing one or more I/O read requests.

It is understood that additional processes may be inserted before, during, or after blocks 402-412 discussed above. It is also understood that one or more of the blocks of method 400 described herein may be omitted, combined, or performed in a different sequence as desired. In some embodiments, one or more actions illustrated in blocks 402-412 may be performed for any number of I/O requests submitted by guest 112 to a device assigned to VM 110.

Figure 5:
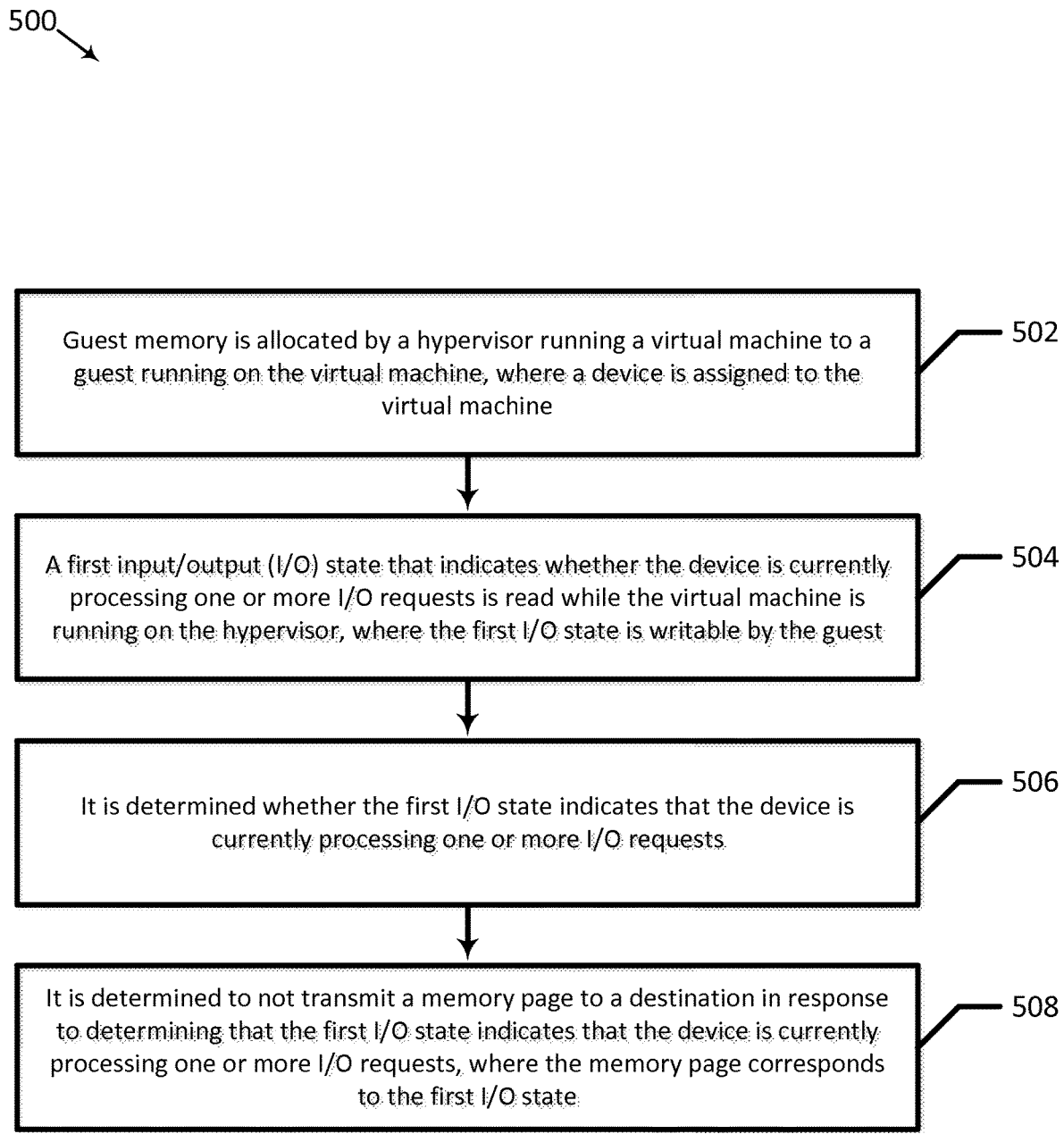
FIG. 5 is a flowchart illustrating a method of tracking memory modified by a device assigned to a virtual machine in accordance with one or more embodiments.

FIG. 5 is a flowchart illustrating a method 500 of tracking memory modified by a device assigned to a virtual machine in accordance with one or more embodiments. Method 500 is not meant to be limiting and may be used in other applications.

Method 500 includes blocks 502-508. In a block 502, guest memory is allocated by a hypervisor running a virtual machine to a guest running on the virtual machine, where a device is assigned to the virtual machine. In an example, hypervisor 120 allocates guest memory 114 to guest 112 running on VM 110, where assigned device 204 is assigned to VM 110. In a block 504, a first input/output (I/O) state that indicates whether the device is currently processing one or more I/O requests is read while the virtual machine is running on the hypervisor, where the first I/O state is writable by the guest. In an example, hypervisor 120 reads, while VM 110 is running on hypervisor 120, in-progress bit 208 indicating whether assigned device 204 is currently processing one or more I/O requests, where in-progress bit 208 is writable by guest 112. In a block 506, it is determined whether the first I/O state indicates that the device is currently processing one or more I/O requests. In an example, hypervisor 120 determines whether in-progress bit 208 indicates that assigned device 204 is currently processing one or more I/O requests. In a block 508, it is determined to not transmit a memory page to a destination in response to determining that the first I/O state indicates that the device is currently processing one or more I/O requests, where the memory page corresponds to the first I/O state. In an example, hypervisor 120 determines to not transmit a memory page in memory region 134 to destination 310 in response to determining that in-progress bit 208 indicates that assigned device 204 is currently processing one or more I/O requests, where the memory page corresponds to in-progress bit 208.

It is understood that additional processes may be inserted before, during, or after blocks 502-508 discussed above. It is also understood that one or more of the blocks of method 500 described herein may be omitted, combined, or performed in a different sequence as desired. In some embodiments, one or more actions illustrated in blocks 502-508 may be performed for any number of memory pages that hypervisor 120 desires to transmit to destination 310.

VI. Example Computing System

Figure 6:
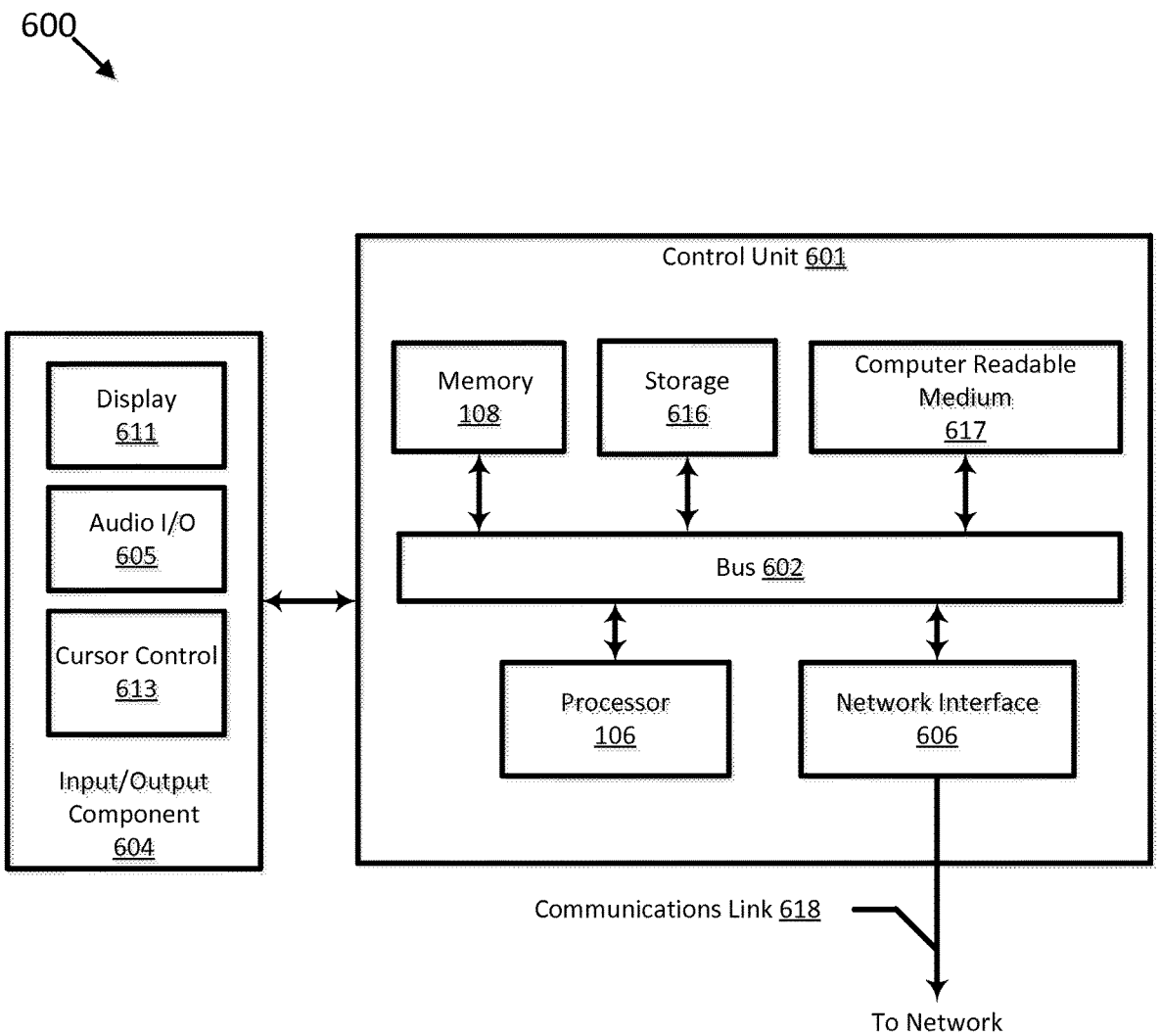
FIG. 6 is a block diagram of an electronic system suitable for implementing one or more embodiments of the present disclosure.

FIG. 6 is a block diagram of a computer system 600 suitable for implementing one or more embodiments of the present disclosure. Each of hypervisor 120 and VM 110 may execute on a computing device. The computing device may include one or more storage devices each selected from a group including a floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) using a computer network (not shown). The computer network may be any type of network including a LAN, a WAN, an intranet, the Internet, a cloud, and/or any combination of networks thereof that is capable of interconnecting computing devices and/or computer programs in the system.

Computer system 600 includes a bus 602 or other communication mechanism for communicating information data, signals, and information between various components of computer system 600. Processor 106, which may be a micro-controller, digital signal processor (DSP), or other processing component, processes these various signals, such as for display on computer system 600 or transmission to other devices via communications link 618. Components of computer system 600 also include a system memory component 634 (e.g., RAM), a static storage component 616 (e.g., ROM), and/or a computer-readable medium 617. Computer system 600 performs specific operations by processor 106 and other components by executing one or more sequences of instructions contained in system memory component 634.

Components include an input/output (I/O) component 604 that processes a user action, such as selecting keys from a keypad/keyboard, selecting one or more buttons or links, etc., and sends a corresponding signal to bus 602. I/O component 604 may include an output component such as a display 611, and an input control such as a cursor control 613 (such as a keyboard, keypad, mouse, etc.). In some examples, an administrator may provide an input indication to hypervisor 120 to migrate VM 110 to a destination hypervisor. An optional audio I/O component 605 may also be included to allow a user to use voice for inputting information by converting audio signals into information signals. Audio I/O component 605 may allow the user to hear audio. A transceiver or network interface 606 transmits and receives signals between computer system 600 and other devices via communications link 618 to a network. For example, hypervisor 120 may send the memory pages updated by assigned device 204 to the destination hypervisor using network interface 606. In an embodiment, the transmission is wireless, although other transmission mediums and methods may also be suitable.

Logic may be encoded in computer-readable medium 617, which may refer to any medium that participates in providing instructions to processor 106 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 634, and transmission media includes coaxial cables, copper wire, and fiber optics, including wires that include bus 602. In an embodiment, the logic is encoded in non-transitory computer-readable medium. Transmission media may take the form of acoustic or light waves, such as those generated during radio wave, optical, and infrared data communications.

Some common forms of computer-readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read. In various embodiments of the present disclosure, execution of instruction sequences (e.g., method 400 or method 500) to practice the present disclosure may be performed by computer system 600. In various other embodiments of the present disclosure, a plurality of computer systems 600 coupled by communications link 618 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer-readable media. It is also contemplated that the application software identified herein may be implemented using one or more general purpose or specific purpose computers and/or computer systems, networked and/or otherwise. Where applicable, the ordering of various blocks described herein may be changed, combined into composite blocks, and/or separated into sub-blocks to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

What is claimed is:

1. A method of tracking memory modified by an assigned device, comprising:
    receiving, by a hypervisor running a virtual machine, a first input/output (I/O) request from a guest running on the virtual machine, the hypervisor and the guest running on a common host machine;
    forwarding, by the hypervisor, the first I/O request to a host backend coupled to the common host machine, the host backend being bound to a pass-through device driver included in the hypervisor and further being accessible by a device assigned to the virtual machine;
    determining, by the hypervisor, whether a first I/O state that is written by a guest indicates that the assigned device is currently processing one or more I/O requests;
    in response to determining that the first I/O state indicates that the assigned device is currently processing one or more I/O requests, determining, by the hypervisor, to not transmit a memory page to a destination, wherein the first I/O state corresponds to the memory page and is writeable by the guest; and
    in response to determining that the first I/O state indicates that the assigned device is not currently processing one or more I/O requests:
        determining, based on a second I/O state, whether the assigned device has completed processing the first I/O request, wherein the second I/O state corresponds to the memory page and is writable by the guest, and wherein the second I/O state is different from the first I/O state; and in response to determining that the second I/O state indicates that the assigned device has completed processing the first I/O request, updating, by the hypervisor, the second I/O state to indicate that the assigned device has not completed processing a second I/O request.

2. The method of claim 1, further comprising:

in response to determining that the first I/O state indicates that the assigned device is not currently processing one or more I/O requests, reading, while the virtual machine is running on the hypervisor, the second I/O state from a second memory.

3. The method of claim 1, further comprising:

sending a message to the virtual machine that causes the virtual machine to stop using the assigned device;

re-reading, while the virtual machine has stopped using the assigned device, the second I/O state; and in response to determining that the re-read second I/O state indicates that the assigned device has completed processing the first I/O request, transmitting, while the virtual machine has stopped using the assigned device, the memory page to the destination.

4. The method of claim 1, further comprising:

sending a message to the virtual machine that causes the virtual machine to stop using the assigned device;

re-reading, while the virtual machine has stopped using the assigned device, the first I/O state; and in response to determining that the re-read first I/O state indicates that the assigned device is currently processing one or more I/O requests, transmitting, while the virtual machine has stopped using the assigned device, the memory page to the destination.

5. The method of claim 1, wherein the first and second I/O states are stored in guest memory by the guest of the virtual machine.

6. The method of claim 1, wherein an I/O request of the one or more I/O requests is an I/O read request that causes the assigned device to update the memory page.

7. A system for tracking memory modified by an assigned device, comprising:

a hardware memory that stores a first input/output (I/O) state that indicates whether a device assigned to a virtual machine is currently processing one or more I/O requests, wherein the first I/O state corresponds to a memory page;

a guest running on the virtual machine, wherein the guest updates the first I/O state and updates a second I/O state, wherein the second I/O state indicates whether the assigned device has completed processing a first I/O request, and wherein the guest executes a device-specific driver specific to the assigned device, binds the device-specific driver to the assigned device, and accesses the assigned device using the device-specific driver; and a hypervisor that assigns the device to the virtual machine, reads, while the virtual machine is running on the hypervisor, the first I/O state, and determines whether the first I/O state indicates that the assigned device is currently processing one or more I/O requests, wherein in response to determining that the first I/O state indicates that the assigned device is currently processing one or more I/O requests, the hypervisor determines to not transmit the memory page to a destination, wherein in response to determining that the second I/O state indicates that the assigned device has completed processing the first I/O request, the hypervisor updates the second I/O state to indicate that the assigned device has not completed processing a second I/O request, and wherein the guest updates the first I/O state to indicate that the assigned device is not currently processing one or more I/O requests after the guest updates the second I/O state to indicate that the assigned device has completed processing the first I/O request.

8. The system of claim 7, wherein in response to determining that the first I/O state indicates that the assigned device is not currently processing one or more I/O requests, the hypervisor reads, while the virtual machine is running on the hypervisor, the second I/O state that indicates whether the assigned device has completed processing the first I/O request and determines whether the second I/O state indicates that the assigned device has completed processing the first I/O request, and wherein in response to determining that the second I/O state indicates that the assigned device has completed processing the first I/O request, the hypervisor transmits the memory page to the destination, and wherein the memory page corresponds to the second I/O state, and the second I/O state is writable by the guest.

9. The system of claim 8, wherein the first I/O request is a request from the guest to the assigned device, and wherein the guest updates the first I/O state to indicate that the assigned device is currently processing one or more I/O requests, and sends the first I/O request after updating the first I/O state to indicate that the assigned device is currently processing one or more I/O requests.

10. The system of claim 8, wherein the guest detects that the assigned device has completed processing the first I/O request, updates the second I/O state to indicate that the assigned device has completed processing the first I/O request.

11. The system of claim 7, wherein the hypervisor sends a message to the virtual machine that causes the virtual machine to stop using the assigned device and re-reads, while the virtual machine has stopped using the assigned device, the second I/O state, and wherein in response to determining that the re-read second I/O state indicates that the assigned device has completed processing the first I/O request, the hypervisor transmits, while the virtual machine has stopped using the assigned device, the memory page to the destination.

12. The system of claim 7, wherein the hypervisor sends a message to the virtual machine that causes the virtual machine to stop using the assigned device and re-reads, while the virtual machine has stopped using the assigned device, the first I/O state, and wherein in response to determining that the re-read first I/O state indicates that the assigned device is currently processing one or more I/O requests, the hypervisor transmits, while the virtual machine has stopped using the assigned device, the memory page to the destination.

13. The system of claim 7, wherein the guest stores the first and second I/O states in guest memory allocated to the guest.

14. A non-transitory machine-readable medium comprising a plurality of machine-readable instructions that when executed by one or more processors are adapted to cause the one or more processors to perform a method comprising:

receiving, by a hypervisor running a virtual machine, a first input/output (I/O) request from a guest running on the virtual machine, the hypervisor and the guest running on a common host machine;

forwarding, by the hypervisor, the first I/O request to a host backend coupled to the common host machine, the host backend being bound to a pass-through device driver included in the hypervisor and further being accessible by a device assigned to the virtual machine;
determining, by the hypervisor, whether a first I/O state that is written by a guest indicates that the assigned device is currently processing one or more I/O requests;
in response to determining that the first I/O state indicates that the assigned device is currently processing one or more I/O requests, determining, by the hypervisor, to not transmit a memory page to a destination, wherein the first I/O state corresponds to the memory page and is writeable by the guest; and
in response to determining that the first I/O state indicates that the assigned device is not currently processing one or more I/O requests:
  determining, based on a second I/O state, whether the assigned device has completed processing the first I/O request, wherein the second I/O state corresponds to the memory page and is writable by the guest, and wherein the second I/O state is different from the first I/O state; and
  in response to determining that the second I/O state indicates that the assigned device has completed processing the first I/O request, updating, by the hypervisor, the second I/O state to indicate that the assigned device has not completed processing a second I/O request.

15. The non-transitory machine-readable medium of claim 14, the method further comprising:

in response to determining that the first I/O state indicates that the assigned device is not currently processing one or more I/O requests, reading, while the virtual machine is running on the hypervisor, the second I/O state that indicates whether the assigned device has completed processing the first I/O request.

16. The system of claim 7, wherein the guest includes a device-specific driver that communicates with the device without mediation from the hypervisor, and if the device is assigned to the virtual machine, the device is bound to the device-specific driver.

17. The method of claim 2, further comprising:
in response to determining that the second I/O state indicates that the assigned device has completed processing the first I/O request, transmitting the memory page to the destination.

18. The machine-readable medium of claim 14, further comprising:
in response to determining that the second I/O state indicates that the assigned device has completed processing the first I/O request, transmitting the memory page to the destination.

19. The method of claim 1,
wherein a memory of the assigned device is accessible by the guest without causing an exit to the hypervisor.

20. The system of claim 7, wherein the hypervisor allocates guest memory to the guest, receives the first I/O request for the assigned device, and passes the first I/O request to the assigned device, and wherein a memory of the assigned device is accessible by the guest without causing an exit to the hypervisor.

* * * * *